(12) United States Patent
Drain et al.

(10) Patent No.: US 12,541,449 B2
(45) Date of Patent: Feb. 3, 2026

(54) AUTOMATIC GENERATION OF ASSERT STATEMENTS FOR UNIT TEST CASES

(71) Applicant: MICROSOFT TECHNOLOGY LICENSING, LLC., Redmond, WA (US)

(72) Inventors: Dawn Drain, Bellevue, WA (US); Neelakantan Sundaresan, Bellevue, WA (US); Alexey Svyatkovskiy, Bellevue, WA (US); Michele Tufano, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/382,985

(22) Filed: Oct. 23, 2023

(65) Prior Publication Data

US 2024/0070053 A1  Feb. 29, 2024

Related U.S. Application Data

(63) Continuation of application No. 17/080,846, filed on Oct. 27, 2020, now Pat. No. 11,829,282.

(60) Provisional application No. 63/071,337, filed on Aug. 27, 2020.

(51) Int. Cl.
*G06F 9/44* (2018.01)
*G06F 11/3668* (2025.01)
*G06N 3/088* (2023.01)

(52) U.S. Cl.
CPC ...... *G06F 11/3684* (2013.01); *G06F 11/3688* (2013.01); *G06N 3/088* (2013.01)

(58) Field of Classification Search
CPC .. G06F 11/3684; G06F 11/3688; G06N 3/088
See application file for complete search history.

(56) References Cited

U.S. PATENT DOCUMENTS

| 10,949,337 | B1 * | 3/2021 | Yalla | G06N 5/01 |
| 11,442,702 | B2 * | 9/2022 | Smith | G06F 40/284 |
| 2007/0033440 | A1 * | 2/2007 | Tillmann | G06F 11/3684 |
| | | | | 714/38.14 |

(Continued)

OTHER PUBLICATIONS

Ghafari et al. Automatically Identifying Focal Methods under Test in Unit Test Cases (Year: 2015).*

(Continued)

*Primary Examiner* — Bradley A Teets
*Assistant Examiner* — Lenin Paulino
(74) *Attorney, Agent, or Firm* — Workman Nydegger

(57) ABSTRACT

An assert statement generator employs a neural transformer model with attention to generate candidate assert statements for a unit test method that tests a focal method. The neural transformer model is pre-trained with source code programs and natural language text and fine-tuned with test-assert triplets. A test-assert triplet includes a source code snippet that includes: (1) a unit test method with an assert placeholder; (2) the focal method; and (3) a corresponding assert statement. In this manner, the neural transformer model is trained to learn the semantics and statistical properties of a natural language, the syntax of a programming language, and the relationships between the code elements of the programming language and the syntax of an assert statement.

20 Claims, 16 Drawing Sheets

(56) References Cited

U.S. PATENT DOCUMENTS

| | | | |
|---|---|---|---|
| 2012/0072823 A1* | 3/2012 | Lau | G06F 40/143 |
| | | | 717/115 |
| 2015/0135166 A1* | 5/2015 | Tarlow | G06F 11/3604 |
| | | | 717/124 |
| 2016/0188440 A1* | 6/2016 | Bates | G06F 11/3698 |
| | | | 717/145 |
| 2018/0129592 A1* | 5/2018 | Li | G06F 11/3684 |
| 2020/0097261 A1* | 3/2020 | Smith | G06F 40/174 |
| 2020/0160848 A1* | 5/2020 | Rotem | G06N 3/105 |
| 2020/0327444 A1* | 10/2020 | Negi | G06Q 30/0281 |
| 2021/0192321 A1* | 6/2021 | Zhang | G06F 8/427 |
| 2021/0248375 A1* | 8/2021 | Geng | G06F 16/9035 |
| 2021/0294781 A1* | 9/2021 | Fernández Musoles | |
| | | | G06F 16/367 |
| 2022/0051126 A1* | 2/2022 | Quader | G06F 18/214 |

OTHER PUBLICATIONS

Ghafari Automatically Identifying Focal Methods Under Test in Unit Test Cases (Year: 2015).*
Communication pursuant to Article 94(3) received in European Application No. 21726511.5, mailed on Jan. 10, 2025, 4 pages.

\* cited by examiner

AUTOMATIC GENERATION OF ASSERT STATEMENTS FOR UNIT TEST CASES

CROSS-REFERENCE TO RELATED APPLICATIONS

The present application is a continuation of U.S. patent application Ser. No. 17/080,846, filed on Oct. 27, 2000, which claims the benefit of the earlier filed U.S. Provisional Application having Ser. No. 63/071,337 filed on Aug. 27, 2020, both of which are incorporated by reference herein in its entirety.

BACKGROUND

Software testing is a critical phase of software development and is often one of the most time consuming, challenging, and expensive phases of the software development lifecycle. Automated testing is often used to run a tool that carries out the execution of test cases automatically to produce test results without any human intervention. Automated testing saves the developers from manually testing the code and helps validate the functionality of a program (i.e., application, software, product, source code, code) before it is released into production.

There are different levels of testing that may be performed before a software product is released. Unit testing checks the individual software modules of a program (e.g., method or class) in isolation without any interaction with dependencies to ensure that the source code modules operate as intended. Integration testing is where individual modules or components are combined and tested as a group to ensure that the interaction between the different modules does not have any faults. Functional testing checks the entire program's functionality with all the source code components executing together.

Unit tests often employ assertions to test an assumption about a program. An assertion statement contains a Boolean expression that should be true when executed. If the assertion statement is false, an error is generated thereby identifying a possible defect in the program. Generating syntactically and semantically correct assert statements is one of the challenges to automatic test case generation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The automatic generation of assert statements for a unit test case (i.e., unit test, unit test method, test method) is performed using a neural transformer model with attention (i.e., neural transformer model). The neural transformer model with attention automatically predicts the assert statement needed in a test method to test the operation of a focal method.

The neural transformer model with attention is trained through transfer learning which integrates source code and natural language text (e.g., English). The neural transformer model with attention is pre-trained on a large corpus of unsupervised natural language text in order to learn the semantics and statistical properties of the natural language. The neural transformer model with attention is also pre-trained on a large corpus of unsupervised source code methods from a target programming language in order to learn the syntax of the programming language and the relationships between the code elements of the programming language.

The neural transformer model with attention is then fine-tuned on test-assert triplets obtained from historical usage data. The test-assert triplets, TAP, include $\{tm_i', fm_i, a_i\}$, where $tm_i'$ is the test method where the assert statement has been replaced with a placeholder, $fm_i$ is the focal method, and $a_i$ is the assert statement to predict. Fine-tuning the neural transformer model with attention with a supervised training dataset is a translation task with a training objective that learns a mapping of a source code snippet $s_i \rightarrow a_i$ as a conditional probability $P(a_i | tm_i' + fm_i)$, wherein $s_i = tm_i' + fm_i$.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

The subject matter disclosed pertains to an assert statement generator that automatically generates an assert statement for a unit test that tests a particular method (i.e., focal method). The assert statement generator is based on a sequence-to-sequence neural transformer model with attention.

The assert statement generator suggests to a software developer (i.e., user, programmer) one or more candidate assert statements to complete a partially-written unit test method that tests a given focal method. A focal method is a method of a programming language that is subject to a unit test. A unit test is a set of executable programming statements that test the operation of the focal method. An assert statement contains a Boolean expression that should be true when executed. If the assert statement is false, an error is generated thereby identifying a possible defect in the program.

An assert statement is supported in some programming languages, such as Java and Python. The examples shown and described herein are in the Java programming language. However, the use of the Java-based examples should not be constrained as limiting the techniques disclosed herein to this particular programming language.

Figure 1:
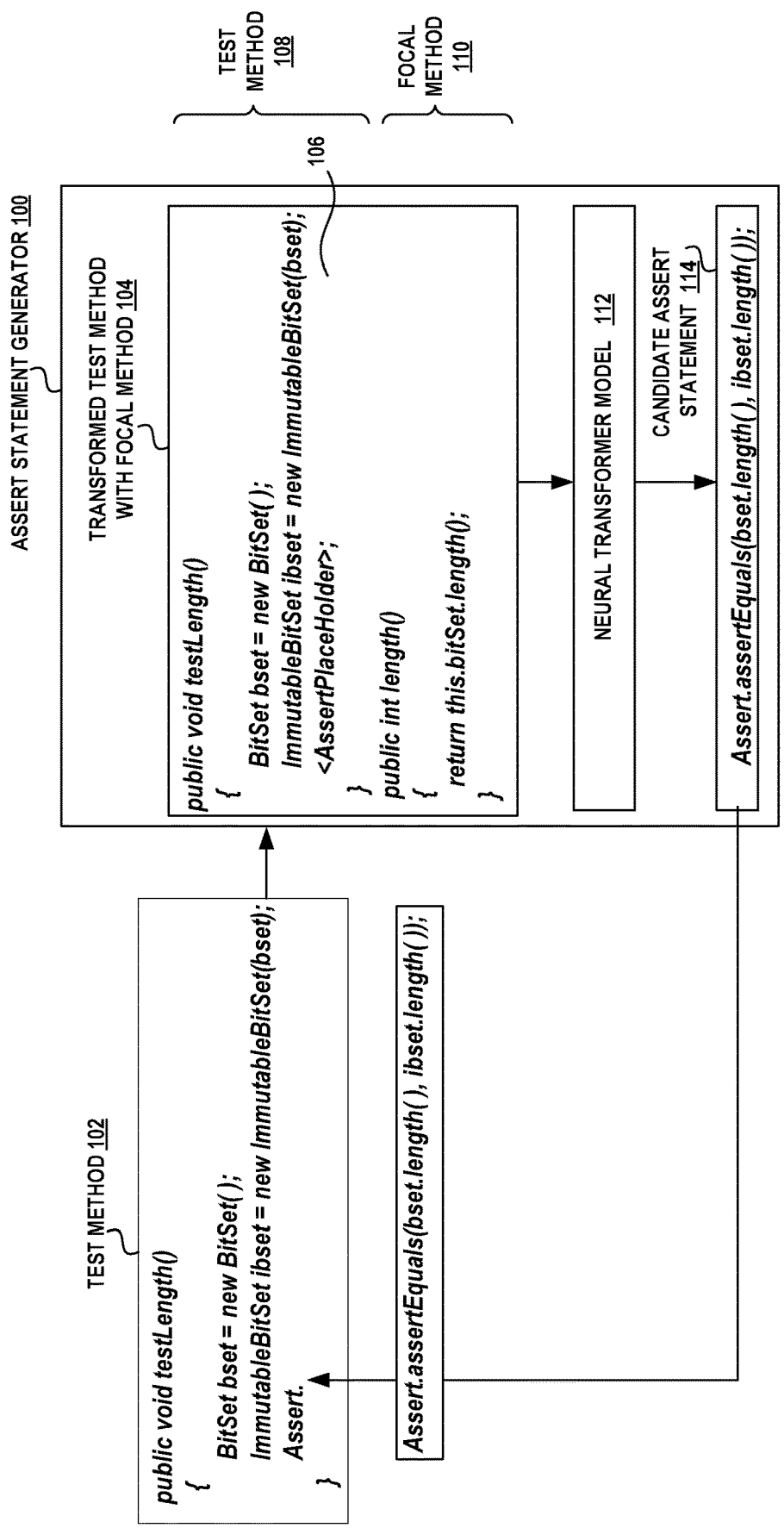
FIG. 1 illustrates a candidate assert statement generated by an assert statement generator using a neural transformer with attention.

Turning to FIG. 1, a developer may be writing a test method testLength 102, in the Java programming language, for the focal method length, in a software development environment that utilizes the asset statement generator 100. The development environment may be a source code editor, an integrated development environment, and the like. The test method 102 creates two sets of bits, bset and ibset, which should be the same length.

The assert statement generator 100 detects that the developer is about to write an assert statement. In this case, the assert statement generator 100 creates a source code snippet that includes the transformed test method with its corresponding focal method 104. The assert statement generator 100 modifies the test method 102 to include an assert placeholder 106 in the location where the developer is about to write in an assert statement. The test method with the assert placeholder, $tm_i'$, and the corresponding focal method 110, $fm_i$, is input into the neural transformer model with attention 112 which predicts one or more candidate assert statements.

As shown in FIG. 1, the neural transformer model with attention 112 predicted the candidate assert statement, Assert.assertEquals(bsalength( ), ibset.length( ), which tests if the two bits, bset and ibset, are of the same length. In Java, a testing framework provides a set of assertion methods that are used in unit test cases. The assertEquals method checks if two objects are equal and if not, an AssertionError is raised. Otherwise, the candidate assert statement 114 is returned back to the software development environment.

The assert statement generator 100 is based on a neural transformer model with attention trained on an unsupervised dataset of source code and natural language text and a supervised dataset of test-assert triplets. The neural transformer model with attention handles dependencies between its input and output with attention and without using recurrent neural networks (RNN) (e.g., long short-term memory (LSTM) network, gated recurrent unit (GRU)) and convolutional neural networks (CNN). Attention is a mechanism that identifies which parts of an input sequence are relevant to each symbol in the output sequence and allows the neural transformer to access the entire input sequence all at once.

Transfer Learning

The neural transformer model with attention is trained through transfer learning. Transfer learning is a methodology of training models by pre-training the model using unsupervised learning on unlabeled data to learn generalized knowledge and then fine-tuning the model for sequence-to-sequence translation tasks via supervised learning on labeled data. The neural transformer model with attention is pre-trained on a large unsupervised training dataset of unlabeled English text and on a large unsupervised training dataset of unlabeled source code. The neural transformer model with attention is then separately fine-tuned on test-assert triplets.

Figure 2:
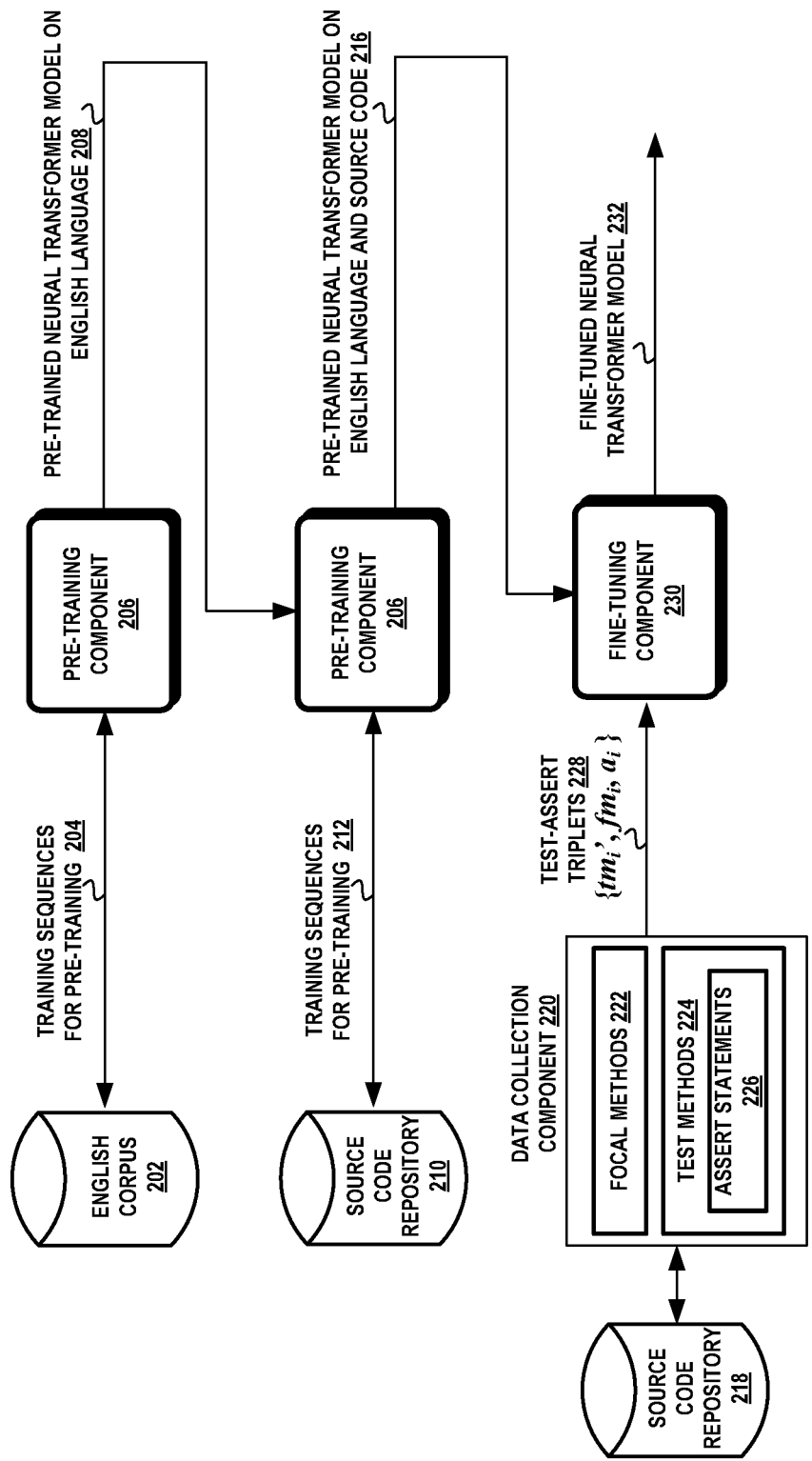
FIG. 2 is a schematic diagram illustrating the transfer learning process of the neural transformer model with attention.

FIG. 2 illustrates the various phases of training the neural transformer model with attention using transfer learning 200. Turning to FIG. 2, a pre-training component 206 generates an unsupervised training dataset 204 from a large corpus of English text 202. In one aspect, the English text may be obtained from any one or more of the following four corpora: (1) Books Corpus, and English Wikipedia corpus; (2) the English language portion of the CommonCrawl News ("CC-NEWS") dataset which contains 63 million English news articles crawled between September 2016 and February 2019; (3) the OPENWEBTEXT dataset; and (4) STORIES, a dataset containing a subset of the CommonCrawlNews data filtered to match the story-like style of Winograd schemas.

The pre-training component 206 also generates an unsupervised training dataset 212 from source code files from various source code repositories 210. A source code repository 210 may be a file archive and web hosting facility that stores large amounts of source code either privately or publicly. A source code repository 210 can be structured as a version control system, such as GIT, Mercurial, etc. The source code repository 210 may contain source code files from different domains, such as without limitation, scientific computing, web development, dataflow programming, machine learning, and the like.

The pre-training component 206 trains a neural transformer model with attention on both the English language text and the source code independently. As shown in FIG. 2, the pre-training component 206 trains a neural transformer model with attention on the English text sequences 204 and then on the source code sequences 212. The pre-training on English corpus allows the model to learn semantic relationships between words. The subsequent pre-training on source code is intended to specialize the model on source code, aiming at learning syntactical properties of the programming language, while retaining semantic knowledge.

A data collection component 220 mines a source code repository 210 to obtain historical usage data having test methods 224 with assert statements 226 and their corresponding focal methods 222. A test method is a unit test method, a focal method is the method being tested by the unit test, and the assert statement is within the test method. The data collection component 220 extracts methods beginning with the @Test annotation as a test method and selects those with a single assert statement. The corresponding focal method 222 is found using heuristics. The assert statement is replaced with an assert placeholder. The test-assert triplet is then formed, TAP={$tm_i'$, $fm_i$, $a_i$}. The TAP triplets 228 are used by the fine-tuning component 230 to train the neural transformer model with attention to learn to translate an input sequence to an output sequence. The output of the transfer learning system is a trained neural transformer model with attention 232 that can translate a source code snippet, $\{tm_i', fm_i\}$, into a corresponding assert statement, $a_i$.

Attention now turns to a description of a neural transformer model with attention.

Neural Transformer Model Architecture

Figure 3:
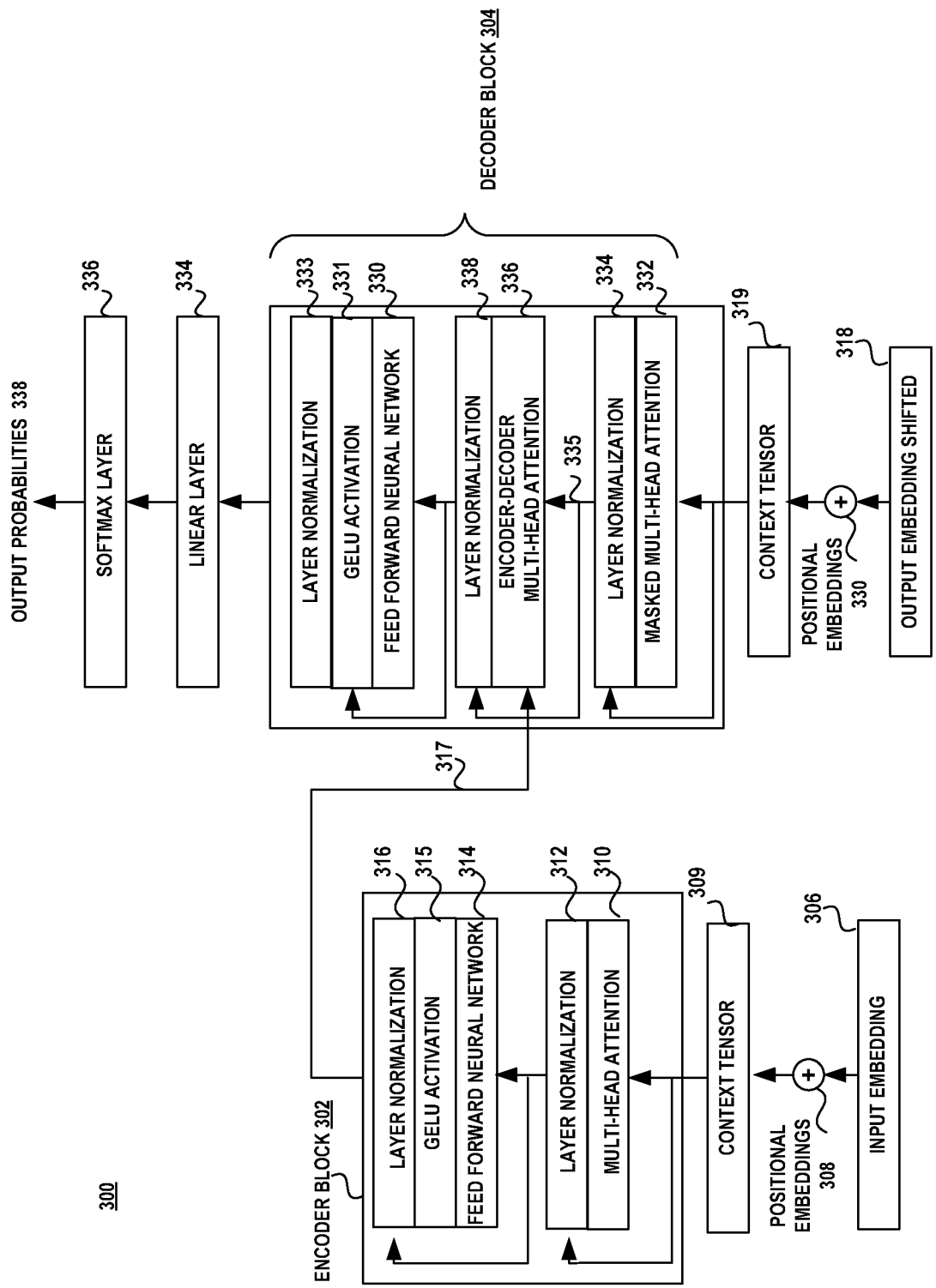
FIG. 3 is a schematic diagram illustrating an exemplary architecture of a neural transformer model based on encoder and decoder blocks with multi-head attention.

FIG. 3 shows an exemplary structure of the neural transformer model with attention in an encoder-decoder configuration. The neural transformer model with attention 300 contains one or more encoder blocks 302 and one or more decoder blocks 304. The initial inputs to an encoder block 302 are the input embeddings 306 of an input sequence of a training dataset. In order to retain the order of the tokens in the input sequence, positional embeddings 308 are added to the input embedding 306 forming a context tensor 309. The initial inputs to the decoder block 304 are a shifted sequence of the output embeddings 318 to which the positional embeddings 320 are added forming context tensor 319.

An encoder block 302 consists of two layers. The first layer includes a multi-head attention component 310 followed by layer normalization component 312. The second layer includes a feed-forward neural network 314 followed by a GELU activation layer 315 and then a layer normalization component 316. The context tensor 309 is input into the multi-head attention layer 310 of the encoder block 302 with a residual connection to layer normalization 312. The output of the layer normalization 312 is input to the feed forward neural network 314 with another residual connection to layer normalization 316. The output of the encoder block 302 is a set of hidden representations 317. The set of hidden representations 317 is then sent through additional encoder blocks, if multiple encoder blocks exist, or to the decoder 304.

Attention is used to decide which parts of the input sequence are important for each subtoken, especially when decoding long sequences since the encoder is limited to encoding a fixed-size vector. Attention mechanisms gather information about the relevant context of a given subtoken and then encode that context into a vector which represents the subtoken. It is used to identity the relationships between subtokens in the long sequence while ignoring other subtokens that do not have much bearing on a given prediction.

The multi-head attention component 310 takes a context tensor 309 and weighs the relevance of each subtoken represented in the context tensor to each other by generating attention weights for each subtoken in the input embedding 306. In one aspect, the attention function is scaled dot-product attention which is described mathematically as follows:

$$\text{Attention}(Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one subtoken in a sequence, K is the vector representations of all subtokens in the sequence, and V is the vector representations of all the subtokens in the sequence.

The queries, keys and values are linearly projected h times in parallel with $d_v$ output values which are concatenated to a final value:

$$\text{MultiHead}(Q,K,V)=\text{Concat}(\text{head}_1, \ldots, \text{head}_h)W^o,$$

where $\text{head}_i=\text{Attention}(QW_i^Q, KW_i^K, VW_i^V)$, with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W^O \in \mathbb{R}^{hd_v \times d_{model}}$.

In order to reduce the training time of the neural transformer, layer normalization is used between the layers. The layer normalization component normalizes the inputs across the features. The mean and standard deviation is computed across the feature dimensions. There is a first layer normalization 312 that precedes the feed forward neural network 314 and a second layer normalization 316 that follows the feed forward neural network 314.

The feed-forward neural network 314 processes each output encoding separately 313. The output of the top encoder block is a set of attention vectors K and V 317 which is used by the encoder-decoder multi-head attention layer 326 of the decoder block 304.

The GELU 315, 331 is an activation function that scales the output of the feed-forward neural networks for the layer normalization layer. The GELU is defined as follows:

$\text{GELU}(x)=0.5x(1+\tanh\ (\sqrt{2/\pi}\ (x+0.044715x^3)))$. The GELU activation function is used to achieve faster and better convergence than a sigmoid function and to avoid the vanishing gradient problem.

The decoder block 304 predicts each subtoken $t_i$ in the target language one-by-one at each time step conditioned on all previously-generated target subtokens $t_1, \ldots t_{i-1}$. The decoder block 304 consists of three layers. The first layer includes a masked multi-head attention component 322 followed by a layer normalization component 324. The output of the layer normalization component 324 is input into the encoder-decoder multi-head attention component 326 with a residual connection to layer normalization component 328. The second layer includes an encoder-decoder multi-head attention component 326 followed by a layer normalization component 328. The output of layer normalization component 328 is input into the feed forward neural network 330 with a residual connection to layer normalization component 332. The third layer includes a feed forward neural network 330 followed by GELU activation 331 and then a layer normalization component 332.

The masked multi-head attention component 322 receives the output embeddings of the previous timestep. The masked multi-head attention component 322 masks the output embeddings from future time steps. The encoder-decoder multi-head attention layer 326 receives queries from the previous decoder layer 325 and the memory keys and values 317 from the output of the encoder block 302. In this manner, the decoder block 304 can attend to every position of the input sequence. The feed-forward neural network 330 processes each output encoding separately. A layer normalization component 324, 328, 332 is used between the layers in order to normalizes the inputs across the features.

The linear layer 334 projects the vector produced by the stack of decoders into a logits vector. The softmax layer 336 then turns the scores of the logits vector into probabilities for each subtoken in the vocabulary which are positive and normalized.

In one aspect, the neural transformer model contains a stack of twelve encoder blocks and a stack of twelve decoder blocks which are aggregated into a neural transformer block. The output of each encoder block is passed onto the next encoder block and processed. Each decoder block receives the attention weights computed from the last encoder block. The use of multiple stacked encoder blocks and decoder blocks increases the model's capacity allowing the model to learn increasing levels of abstraction.

Methods

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 4:
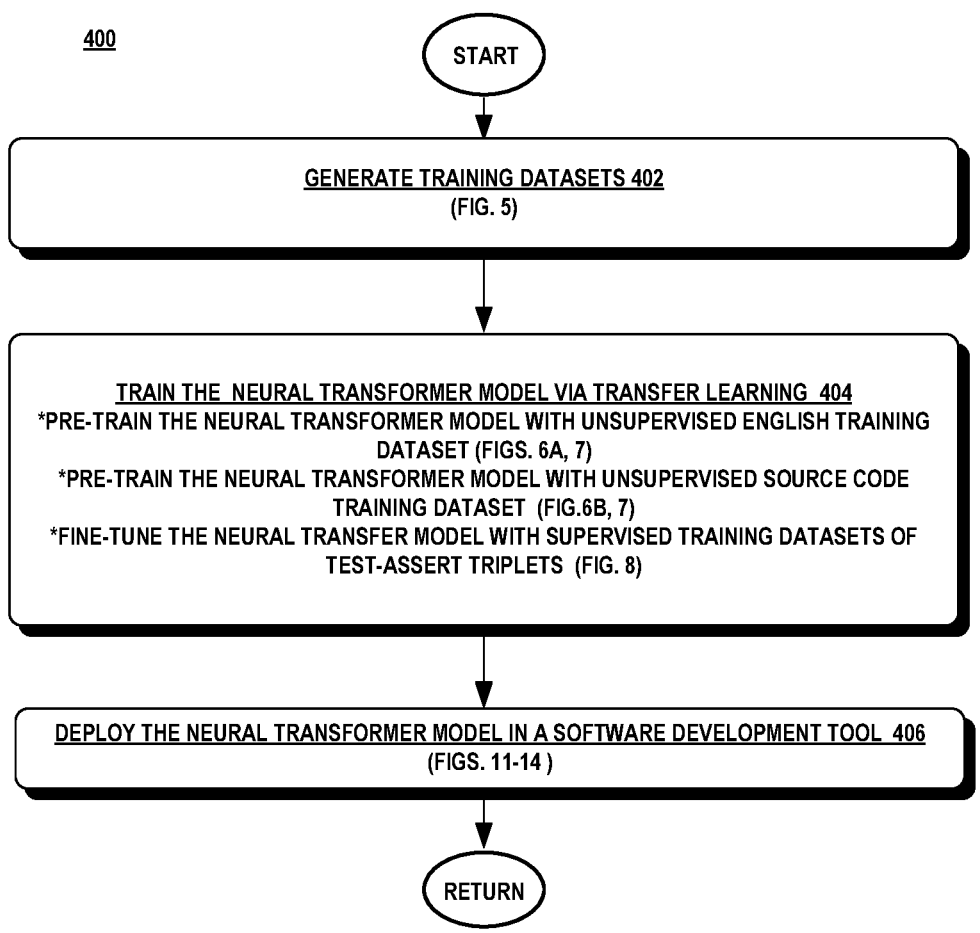
FIG. 4 is a flow diagram illustrating an exemplary method for training the neural transformer model with attention and deploying the neural transformer model with attention in an assert statement generator.

FIG. 4 is a flow diagram illustrating an exemplary process for training a neural transformer model with attention for assert statement generation and deploying the neural transformer model with attention in an assert statement generator and/or software development environment. Initially, the training datasets are generated (block 402). The training datasets include sequences of English text, sequences of source code and test-assert triplets (block 402).

The neural transformer model with attention is then trained through a transfer learning process that includes pre-training the neural transformer model with an unsupervised training dataset of English text and source code (block 404) and fine-tuning the neural transformer model with a supervised training dataset of test-assert triplets (block 404). When the model has been trained and verified successfully, the neural transformer model with attention is deployed to predict candidate assert statements in a software development environment (block 406).

Generating Training Datasets

Figure 5:
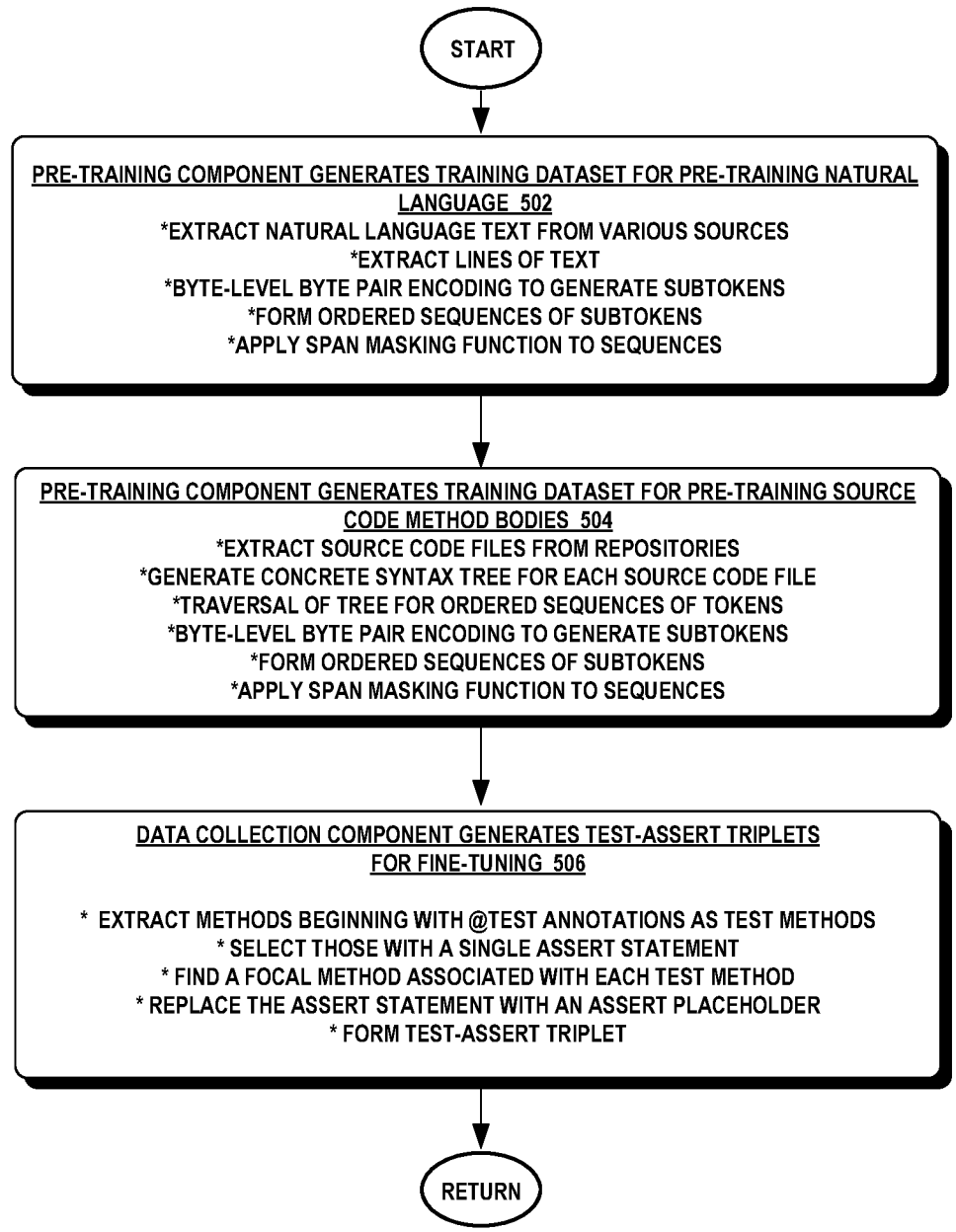
FIG. 5 is flow diagram illustrating an exemplary method for generating the training datasets for the neural transformer model with attention.
Figure 6A:
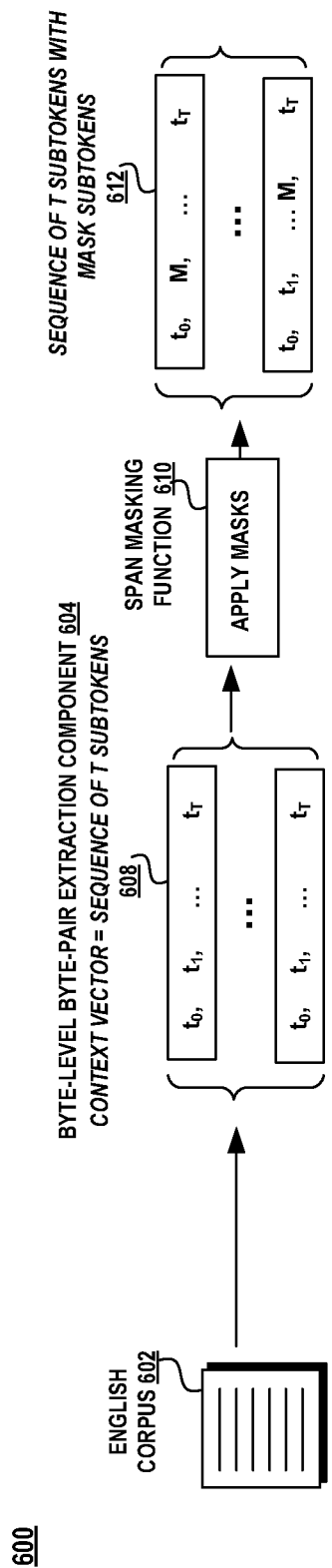
FIGS. 6A and 6B are schematic diagrams illustrating an exemplary process for generating masked sequences of the pre-training datasets.
Figure 6B:
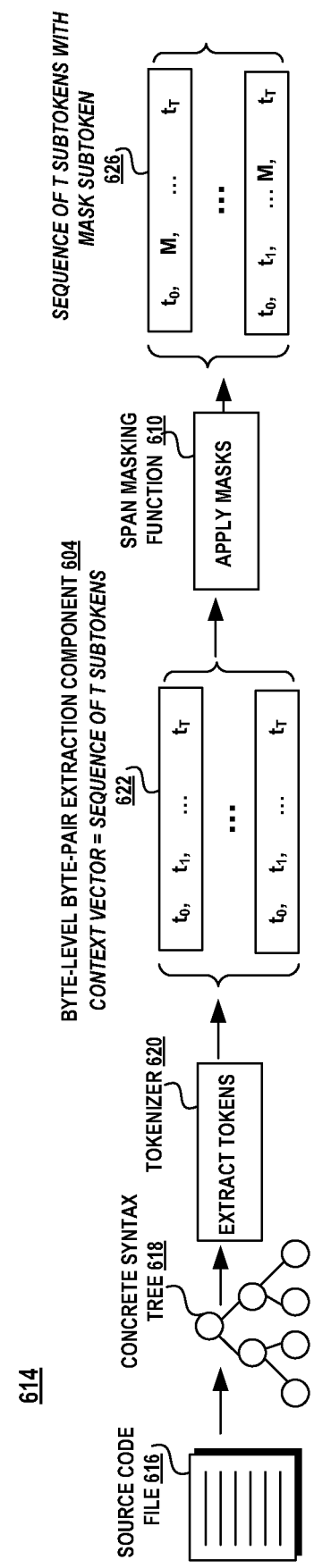

FIGS. 5, 6A and 6B illustrates an exemplary method 500 for generating the training datasets in one aspect. Turning to FIGS. 5 and 6A, the pre-training training component 206 generates an unsupervised training dataset to pre-train the neural transformer model with attention on a natural language (block 502). In one aspect, the natural language is English language text. A diverse corpus of unlabeled English text, derived from the sources noted above 602, is used to obtain sequences of English-language text. A byte-level byte-pair extraction component 604 is used to generate T-ordered sequences of subtokens 608 from each line of English text, where T is the maximum context length. Byte-level byte-pair encoding (BBPE) is used to generate the vocabulary used by the neural transformer model with attention. A text string of natural language text is represented as a sequence of Unicode Transform Format, UTF-8 bytes. The input text string of subtokens is encoded as a sequence of UTF-8 bytes, where a subtoken is encoded into one to four bytes. A byte sequence is then partitioned into byte-level subwords, referred to as byte n-grams. (Collectively, block 502).

The byte-level subwords are generated using the Byte Pair Encoding (BPE) component 604, which extracts the k most frequently-occurring n-grams. The result is a vocabulary size of the k most frequently-occurring n-grams. An n-gram is a contiguous sequence of n subtokens from an input text string of either source code or natural language text. This type of encoding does not rely on knowing the underlying language making it suitable for an input sequence of text strings that contain source code or natural language text. The ordered sequences of UTF-8 bytes are translated into a T-ordered sequence of subtokens which are vector representations of a natural language text segment. The T-ordered sequence of subtokens are represented into a context vector 608. (Collectively, block 502).

A denoising function, such as a span masking function 610, is then applied to each sequence that randomly masks out a subset of subtokens and the masked span of subtokens is replaced with a mask subtoken, M. The model is trained with the masked sequences 612 to learn to reconstruct the original sequence without the masked subtokens. In one aspect, the mask subtoken replaces a span of subtokens. The number of text spans and the span lengths are randomly generated and each span is replaced with a single mask subtoken. The masked denoising is based on the doze task of evaluating human language-learners' proficiency, in which humans are given a foreign language with missing words, and are asked to correctly choose the missing word. The benefit of span-masking denoising in pre-training is that the model learns the desired language in an unsupervised fashion, but also is bi-directional in the sense that it learns the relationships of words both before and after their occurrence. (Collectively, block 502).

Turning to FIGS. 5 and 6B, the pre-training component 206 generates a pre-training dataset from a corpus of unlabeled source code programs or files 602 in the same programming language. This is referred to as unsupervised learning since the model draws inferences from the input data without labeled responses. The pre-training component 206 extracts selected source code files 616 from various source code repositories where the source code is written in a same programming language. In one aspect, the pre-training component 206 extracts source code files 616 written in the Java programming language. (Collectively, block 504).

The pre-training component 206 transforms each of the selected source code files 616 into a concrete syntax tree 618. The concrete syntax tree 618 represents the source code text in a parsed form. The concrete syntax tree 618 may also be a parse tree. A concrete syntax tree 618 represents the syntactic structure of a program in a hierarchical or tree structure. The concrete syntax tree 618 is an n-ary tree data structure that includes nodes that represent a construct in the grammar of the programming language of a program. The concrete syntax tree 618 includes one root node, multiple internal nodes, and multiple terminal nodes. The terminal nodes represent the tokens. A token is a symbol that represents an operand or an operator. The concrete syntax tree 618 differs from an abstract syntax tree where the terminal nodes represent operands. (Collectively, block 504).

The pre-training component 206 uses a tokenizer 620 to extract tokens from the concrete syntax tree 618. The frequently-used elements in a programming language are encoded into tokens and the less frequently-occurring elements are encoded into combinations of characters referred to as subtokens. For simplicity, the term subtoken shall include tokens and subtokens. (Collectively, block 504).

The pre-training component 206 uses a byte-level byte-pair extraction component 604 to generate T-ordered sequences of subtokens 622 as noted above. A denoising function, such as a span masking function 610, is then applied to each sequence 626 that randomly masks out a subset of subtokens and the masked span of subtokens is replaced with a mask subtoken, M, as noted above. (Collectively, block 504).

The data collection component 220 generates test-assert triplets by mining source code repositories to find test methods with a single assert statement (block 506). A test method is a method beginning with @Test annotation. The data collection component 220 selects those test methods having a single assert statement. A focal method that is associated with the test method is then identified using a data flow analysis-based heuristic. Once found, the assert statement is replaced with an assert placeholder and the data collection component 220 creates the test-assert triplet, TAP={$tm_i'$, $fm_j$, $a_i$}. (Collectively, block 506).

The data collection component 220 finds a focal method associated with a test method by identifying the last assert statement in a test method. The data collection component 220 finds all the declarations of the variables and objects that affect the parameters of the last assert statement. Using data flow analysis, the data collection component finds the last method invocation whose result or behavior is tested within the assert statement. Given this method invocation, the associated method definition (i.e., the source code of the focal method) is retrieved within a software project or repository. The retrieval is performed using named-based heuristics, matching the focal class's name, identified by imports and object instantiation within the test method (i.e., unit test case), as well as the method's name, identified by the method invocation. (Collectively, block 506).

Attention now turns to a discussion of the training of the neural transformer model with attention with the training datasets.

Training the Neural Transformer Model

Figure 7:
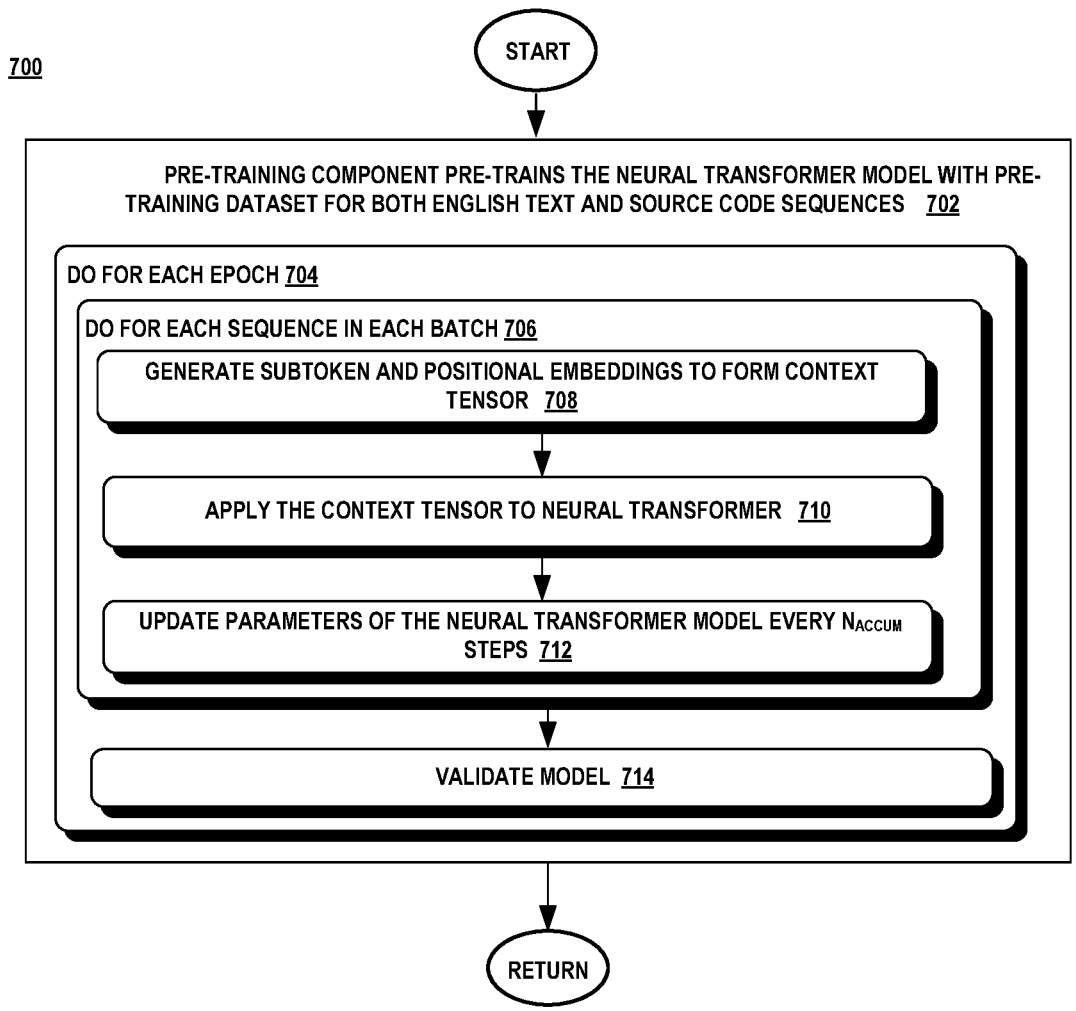
FIG. 7 is a flow diagram illustrating an exemplary method for pre-training the neural transformer model with attention with source code and natural language text.
Figure 8:
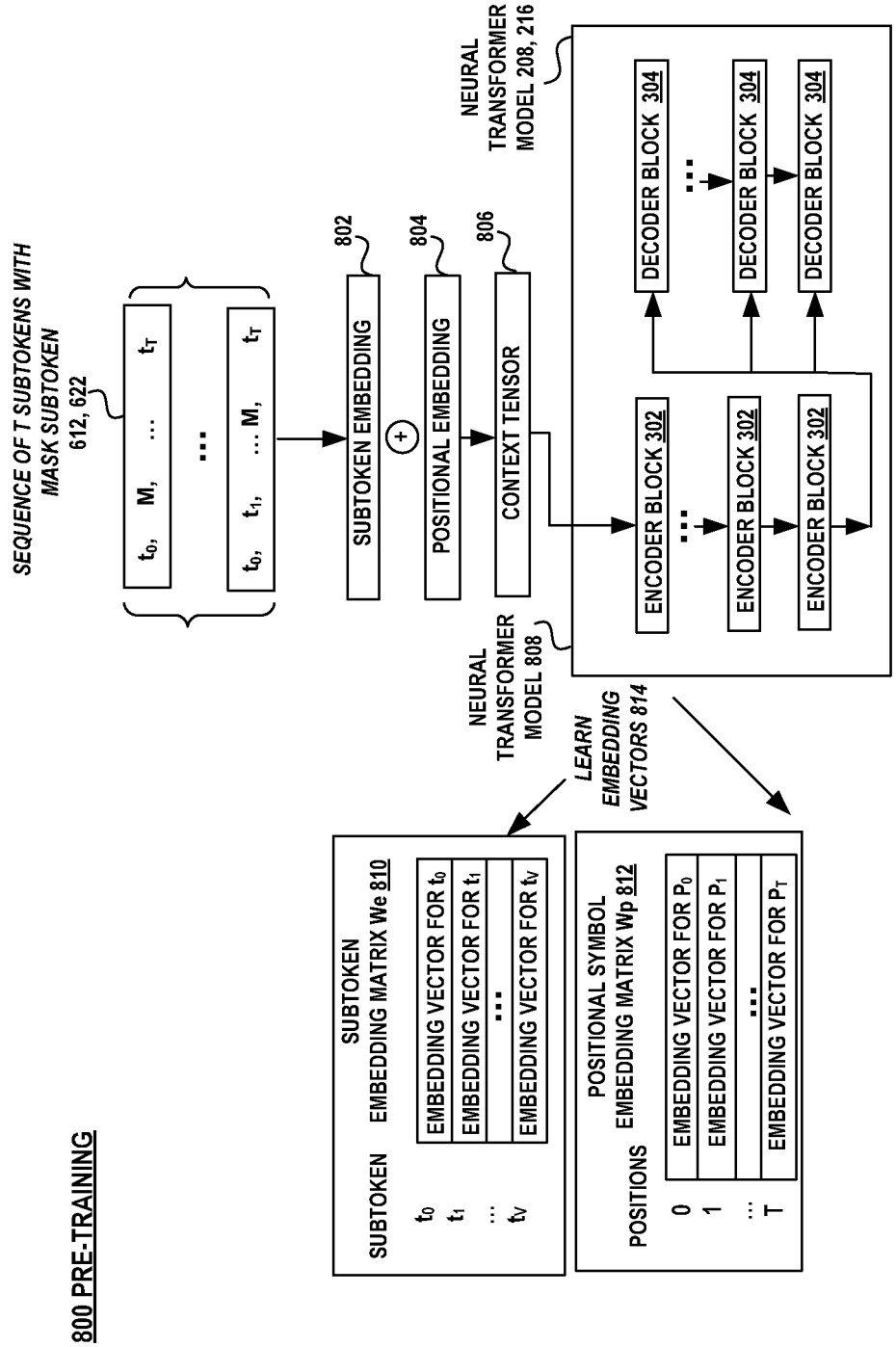
FIG. 8 is a schematic diagram illustrating an exemplary process of pre-training the neural transformer model with attention and the components used therein on a natural language and source code.

Turning to FIGS. 7 and 8, the pre-training component 206 pre-trains the neural transformer model with attention with the pre-training datasets (e.g., English text and source code) (block 802). Each pre-training dataset is used to train the neural transformer model independently. For example, masked sequences of English text are feed through the pre-training pipeline first (blocks 702-714) and when that phase of the training is completed, the process repeats with the masked sequences of source code (blocks 702-714).

Neural transformer models are trained iteratively, making multiple passes over the pre-training dataset before converging to a minimum. An epoch represents the entire training dataset passed forwards and backwards through the neural transformer block once. Since the training dataset is very large, it is partitioned into smaller batches. The training is iterative and the entire dataset is passed through the neural transformer in multiple iterations. Each training iteration includes forward propagation, loss calculation, backpropagation steps followed by updating the weights. The training dataset is partitioned into batches with each batch of sequences running through the training process. (Collectively, block 702).

The neural transformer model has multiple blocks and layers so that more detailed relationships within the data are learned as well as how the features interact with each other on a non-linear level. The model architecture, training procedure, data normalization and vocabulary encoding procedures are hyperparameters that are tailored to meet a particular objective. The values of the hyperparameters influence how the parameters are learned. (Collectively, block 702).

In one aspect, the hyperparameters may include the following: (1) subtoken and position embedding layers of dimensions: 30000×768, and 1024×768 respectively; (2) the configuration of the neural transformer model with twelve encoder blocks and twelve decoder blocks; (3) for the training procedure: denoising auto-encoder, with a cross-entropy loss optimization objective; the sequence length of 1024 symbols; a mini-batch size of 8; the gradient accumulation steps for each weight update is 8; the Adam stochastic optimization procedure is used to train the feed forward neural network; and an inverse square root learning rate schedule with the base learning rate of 0.0001; a warmup period of 5000 update steps; local gradient accumulatio with a frequency of four update steps; (4) the data normalization procedure: normalize all string and numerical literals, keeping the ten most frequent; and (5) the vocabulary encoding procedure: byte-level byte-pair encoding, preserve the ten most frequent string and numerical literals encoding them as a single token during byte-level byte-pair encoding procedure; and introduce special control flow tokens to denote end-of-line, end-of-file, end-of-method, dedent, and indent symbols. (Collectively, block 702).

For each sequence of each batch in each epoch (blocks 704, 706), the T-ordered sequences of subtokens are then mapped into numeric vectors and then into respective subtoken embeddings 810 and positional embeddings 812 (block 708). An embedding is a learned representation for the text-based subtokens where subtokens that have a common meaning have a common representation. An embedding is a mapping of discrete categorical variables to a vector of continuous numbers. There is an embedding for each subtoken in the vocabulary 810 and a corresponding positional embedding 812. The subtoken embedding 810 represents the learned representation for the subtoken. The neural transformer model 208, 216 does not read each subtoken sequentially and as such, has no knowledge of the subtoken's position in a sequence without additional position information. The positional embedding 812 is used to embed position information about a subtoken's position in a sequence into the neural transformer model 208, 216.

Initial values are generated for the subtoken embedding 802 and positional embeddings 804 of each sequence which are then used to form a context tensor 612, 622. Thereafter, the neural transformer model 208, 216 learns the values for each embedding 814. Upon the completion of the pre-training phase, the embeddings for each subtoken and the positional embeddings are saved into respective matrices 810, 812 for later use. There is a subtoken embedding matrix, We, 810 that contains an embedding vector for each subtoken $t_i$, i=0 . . . V, and a positional embedding matrix, Wp, 812 that contains an embedding vector $P_j$, j=0 . . . T, for each position, where V is the size of the vocabulary and T is the length of the subtoken sequence. (Collectively, block 710).

The first encoder block 302 of the neural transformer model 612, 622 takes the context tensor 806 as input and passes it through the multiple layers of multi-head attention, GELU activation layer normalization and feed-forward neural network to finally produce a set of hidden representations If there are additional encoder blocks, the output of each encoder block is passed onto the next encoder block with the output of the last encoder block producing the set of hidden representations. The set of hidden representations is passed onto each decoder block. (Collectively, block 710).

The decoder blocks 304 of the neural transformer models 208, 216 takes a shifted sequence of an output embedding as input. The masking in the masked multi-head attention layer is used to prevent positions from attending to subsequent positions in the future. The masking combined with the output embeddings shifted by one position ensures that the predictions to position T depend only on the known outputs at positions less than T Starting with the first token of the output sequence, the subtokens are passed through the self-attention and normalization layers and into the encoder-decoder attention layer, serving as the query for encoder-decoder attention, where the key and value pairs for the attention are the outputs of encoder. The encoder output was calculated with the entire input embedding sequence. (Collectively, block 710).

The feed forward neural networks in the encoder blocks 302 and the decoder blocks 304 are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, a categorical cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation through time (BPTT) algorithm may be used to update the weights. (Collectively, block 710).

At the completion of each batch, the parameters of the neural transformer model are updated at a preconfigured frequency denoted as Naccum. Naccum is a gradient accumulation frequency and in one aspect has a value of 4. The parameters include the subtoken embeddings and the positional embeddings which are stored in a respective embedding matrix. (Collectively, block 712).

Next, the neural transformer model with attention is validated. Before the neural transformer model with attention is trained, a set of hyperparameters is selected randomly and then tuned to achieve a desired performance. The neural transformer model with attention is tested using a validation dataset to determine the appropriate hyperparameters settings to achieve a desired goal. When the desired goal is not achieved, one or more hyperparameters are adjusted and the training is repeated until the target goal is achieved. Perplexity on the validation set is calculated to validate the performance of the model with respect to the learning the masked out original text. (Collectively, block 714).

Fine-Tuning

After the pre-training is performed, the neural transformer model with attention is fine-tuned on the test-assert triplets. The fine-tuning ensures that the neural transformer model with attention understands the relationship between a test method, focal method and assert statement by training the model with these triplets. Specifically, the optimization objective during fine tuning includes assert statement prediction given the combination of the transformed focal method and test method as an input. The weights of the pre-trained model are transferred and joined to optimize all of the trainable parameters including both the transformer layers and the task-specific head of the model (i.e., linear layer 334, softmax layer 336).

Figure 9:
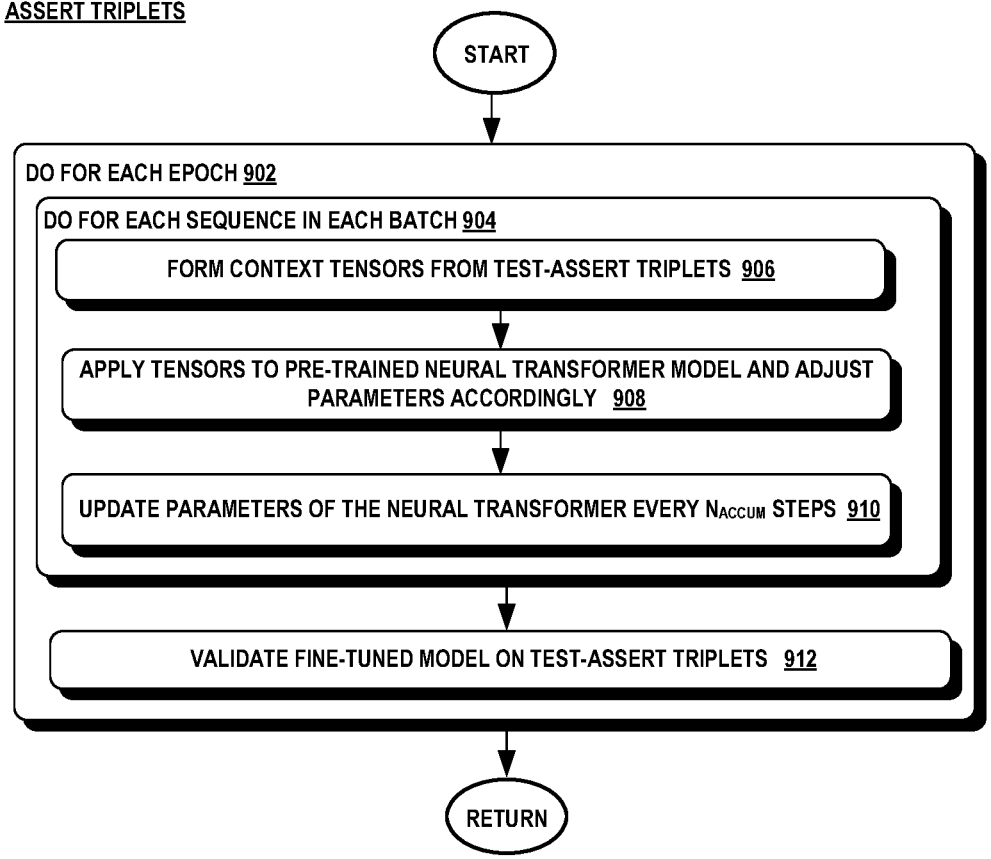
FIG. 9 is a flow diagram illustrating an exemplary method for fine-tuning the neural transformer model with attention.
Figure 10:
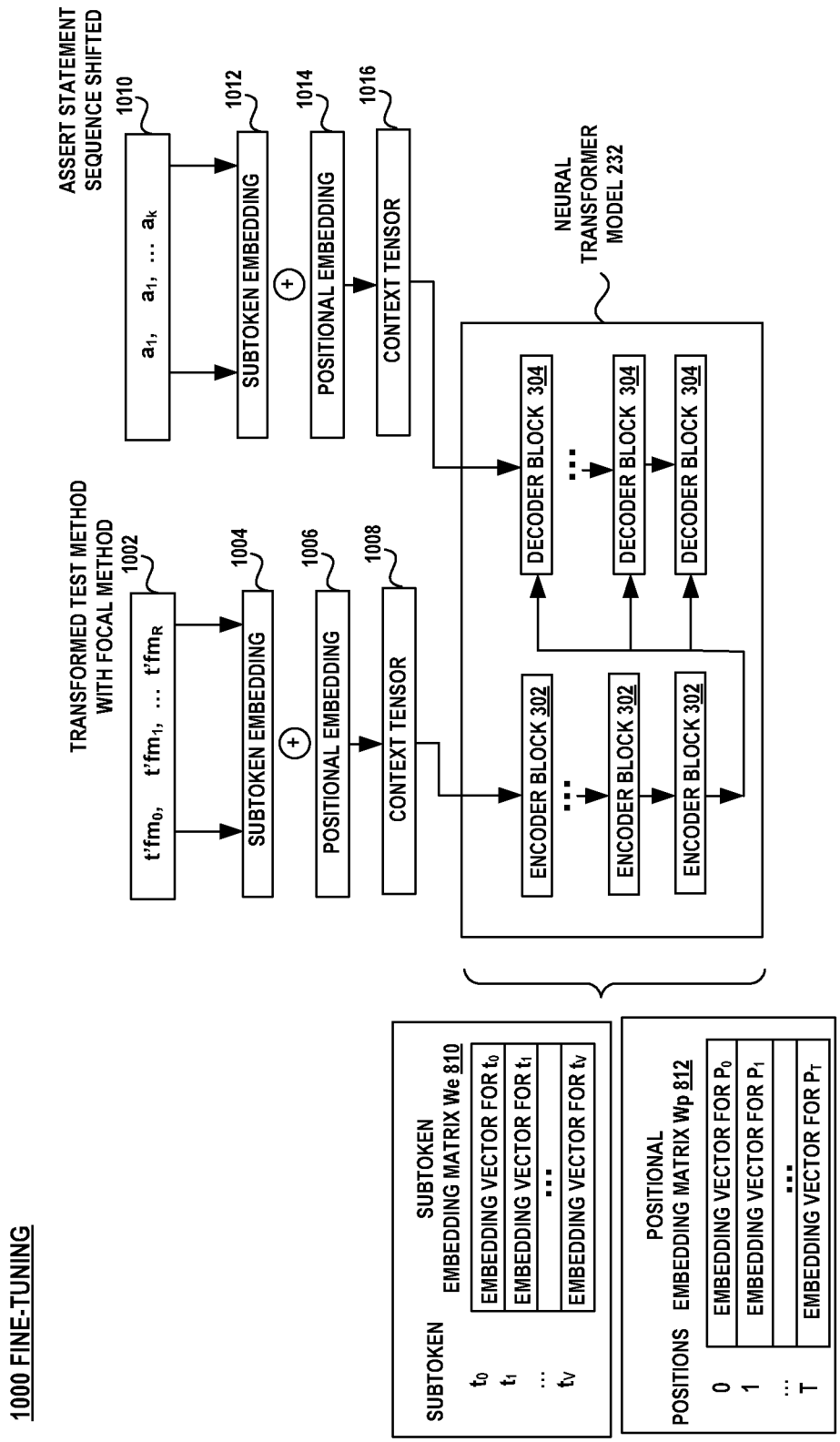
FIG. 10 is a schematic diagram illustrating an exemplary process of fine-tuning the neural transformer model with attention with test-assert triplets.

The fine-tuning component 230 follows a similar method noted above with respect to the pre-training. The fine-tuning method 900, 1000 is shown in FIGS. 9 and 10. Initially, the fine-tuning component 230 obtains the ordered sequence of subtokens 1002 representing the transformed test method and focal method, t'fm$_0$, t'fm$_1$, . . . , t'fm$_R$, and another ordered sequence of subtokens 1010 representing a shifted sequence of subtokens, $a_1, a_2, \ldots, a_k$, representing a corresponding assert statement. For each sequence of each batch in each epoch (blocks 902, 904), the T-ordered sequences of subtokens are then mapped into respective subtoken embeddings 1004, 1012 and positional embeddings 1006, 1014 (block 906). The subtoken embedding 1004, 1012 and the positional embedding 1006, 1014 are combined into a respective context tensor 1008, 1016 (block 906). The context tensor 1008, 1016 is applied to neural transformer model with attention, as noted above, thereby updating the subtoken and positional embedding matrices 810, 812 and generating neural transformer model 232 (blocks 908).

The parameters are updated for every Nachum steps (block 910). The neural transformer model with attention is then validated (block 912) before deployed into an assert statement generator.

Attention now turns to discussion of the use of the neural transformer model in an inference system.

Inference Phase

The inference phase of the assert statement tool relies on a beam search to generate an assert statement for the combination of a focal method and test method. The decoder's computation at training time can be parallelized using masked self-attention but during inference, the subtokens are generated one token at a time. The neural transformer model factorizes the probability of the target subtokens in an input sequence into a product of conditional probabilities for each subtoken using the formula: $p(t_1, \ldots, t_m|s) = \Pi_{i=1}^m p(t_i|t_1, \ldots, t_{i-1}, s)$, where $t_1, \ldots t_m$ are the subtokens of the vocabulary and s represents a candidate assert statement During inference, the calculation of arg max$_t p(t|s)$ is complex and extremely time consuming making the model useless for real-time applications. Beam search is an approximation algorithm that performs faster.

The beam search uses the probability distribution generated by the neural transformer model to identify the top k subtokens likely to be the next subtoken in a candidate assert statement sequence. The beam search expands the search by instantiating new partial sequences using each of the selected subtokens identified by the neural transformer model's probability distribution. The search continues generating new partial sequences from the top k subtokens identified by the output distributions from the neural transformer model until the search ends. The search may end when the end-of-method subtoken appears as the most probable next subtoken.

A beam search uses a breadth-first search to build a search tree. The search tree is composed of nodes at one or more inference levels. Each node represents a probability distribution generated by the neural transformer model for the subtokens in the model vocabulary. At each level, only the top k subtokens having the highest probabilities from the output distribution generated by the neural transformer model are expanded to the next inference level. The variable k is preconfigured and referred to as the beam width. Each of the k subtokens is then expanded into a search that updates the current context sequence with the selected subtoken to input into the neural transformer model to generate an additional probability distribution for the next subtoken in a sequence. This process is repeated until the end of a method token is predicted as being the next likely subtoken candidate.

Figure 11A:
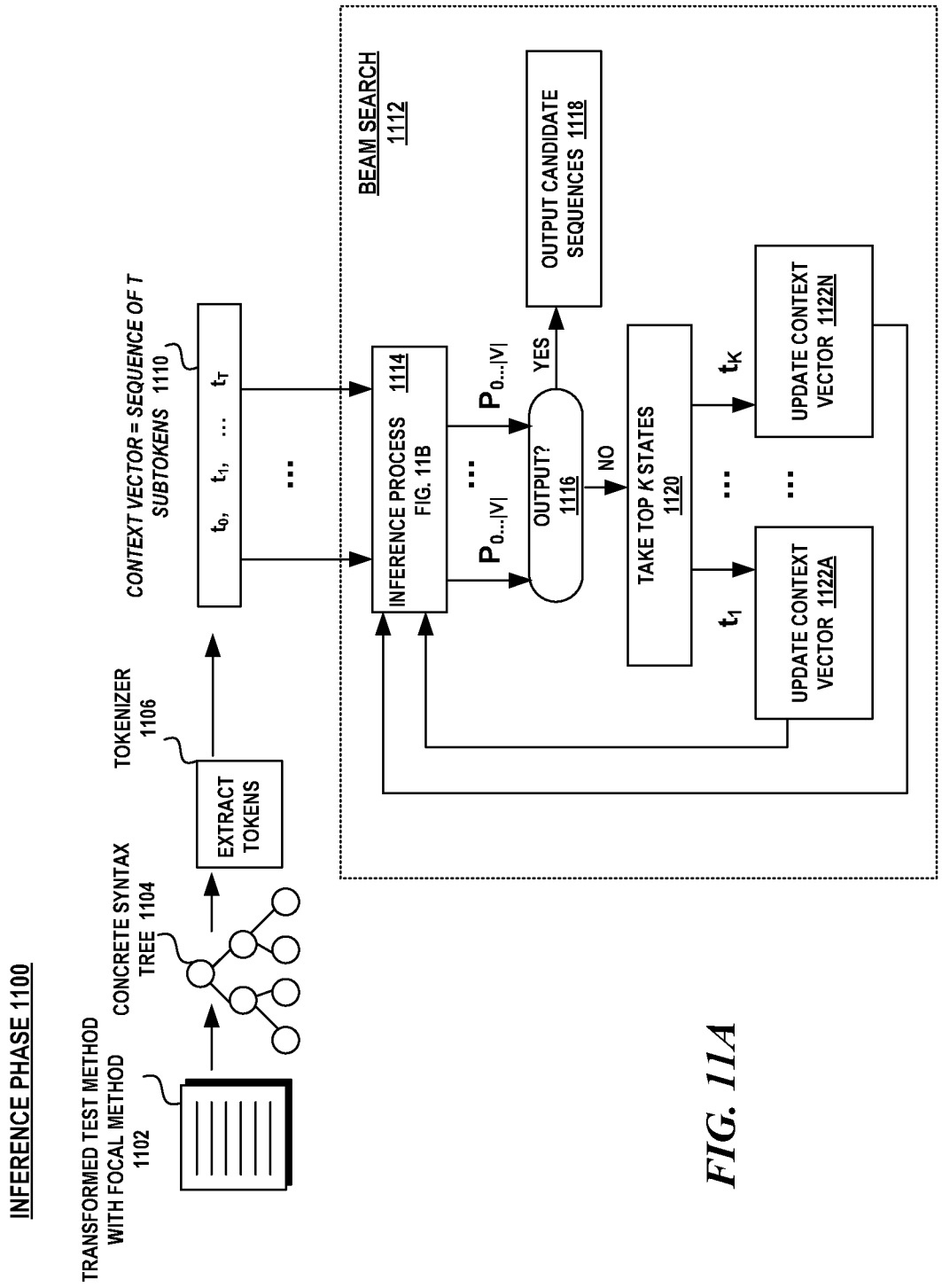
FIGS. 11A-11B are schematic diagrams illustrating the interference process that uses the neural transformer model.

Turning to FIG. 11A, there is shown components of the inference phase 1100. The assert statement generator receives the combined test method with the inserted assert placeholder and focal method 1102. The combined test method with assert placeholder and corresponding focal method is transformed into a corresponding concrete syntax tree 1104. The concrete syntax tree 1104 is traversed, by a tokenizer 1106, to extract tokens and/or subtokens in an ordered sequence. The ordered sequence of T subtokens is then vectorized into a context vector 1110.

The beam search 1112 uses the context vector 1110 to initiate an inference process 1114 using the probability distribution generated from the neural transformer model, $P_0 \ldots P_{|V|}$ (block 1114). If the probability distribution indicates that an end-of-method token is the most likely subtoken to follow in a partial candidate assert statement sequence (block 1116—yes), then the top k assert statement candidates are output (block 1118). Otherwise, the beam search 1112 takes the top k states or subtokens identified from the probability distribution generated by the neural transformer model in the inference process (block 1120). A new context vector is generated for each of the k states, $c_1, \ldots c_k$, using the new subtoken in the context vector (blocks 1122A, 1122N). The new context vectors are then input into the inference process (blocks 1122A, 1122N, 1114). The beam search 1112 ends when the end-of-method token is selected as the most likely candidate to complete a candidate assert statement.

Figure 11B:
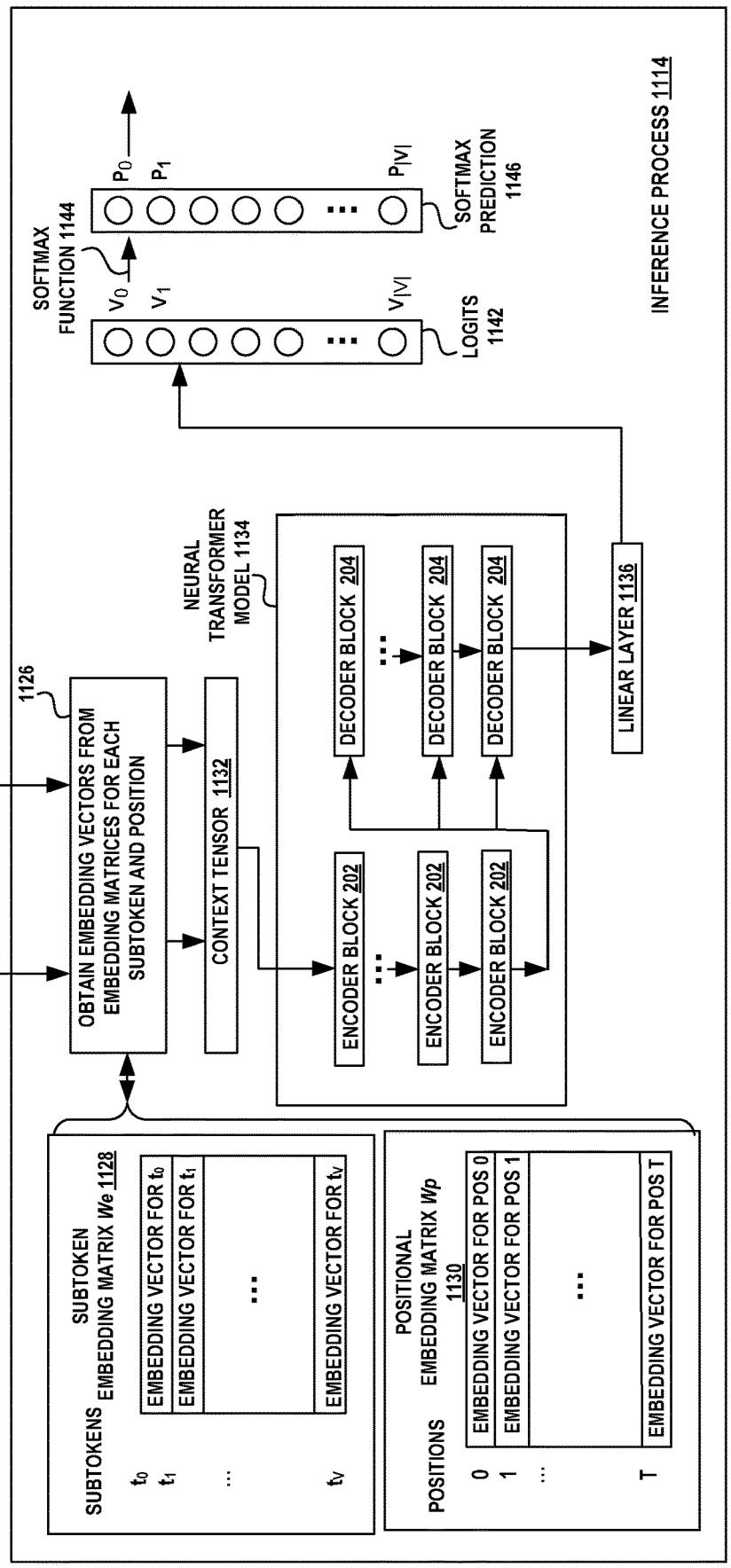

FIG. 11B illustrates an exemplary inference process 1114. An embedding vector for each subtoken in a sequence 1110 is obtained from the subtoken embedding matrix 1128 and its corresponding positional vector from the positional embedding matrix 1130 (block 1126). The obtained subtoken embedding vector and its corresponding positional embedding vector are combined to form a context tensor 1132 which is input into the neural transformer model 1134. The context tensor 1132 is applied to the encoder blocks 202 and decoder blocks 204 of the neural transformer model 1134.

The last decoder block outputs a vector of floating point numbers that is projected by the linear layer 1136 into unnormalized predictions or logits $V_0 \ldots V_{|V|}$ 1142. The logits 1142 are normalized using the softmax function 1144 to generate the softmax prediction 1146, $P_0 \ldots P_{|V|}$.

Assert Statement Generation

Figure 12:
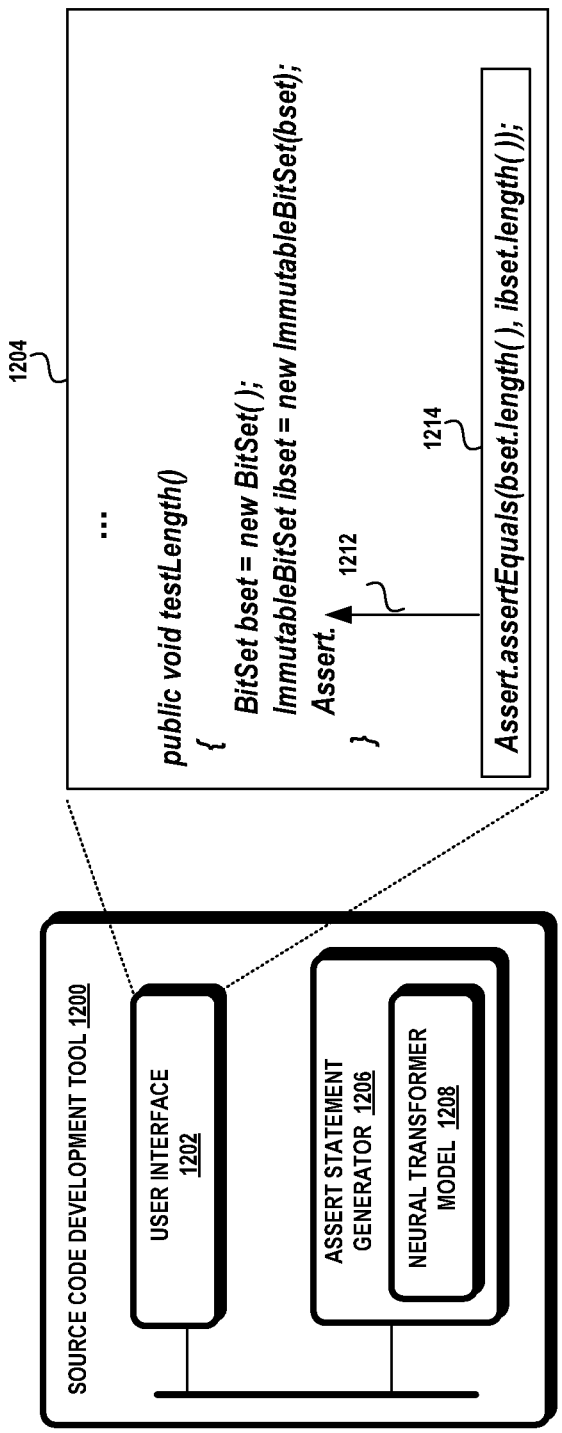
FIG. 12 is a schematic diagram illustrating the assert statement generator in a source code development tool to complete a partially-written unit test method.
Figure 13:
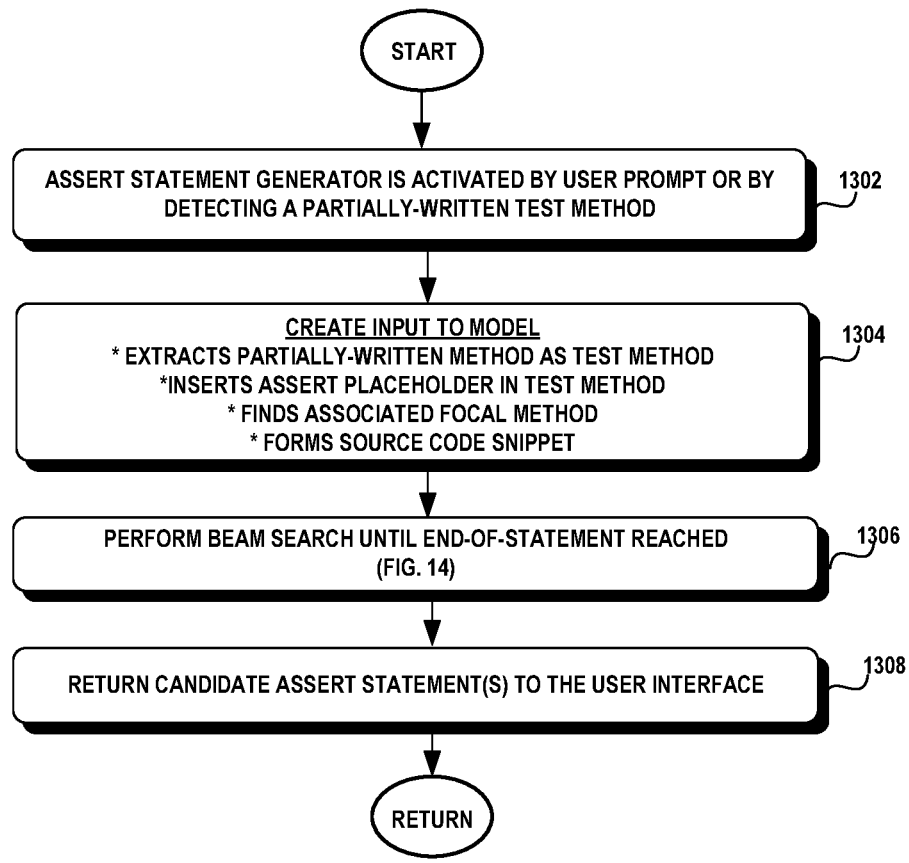
FIG. 13 is a flow diagram illustrating an exemplary method of generating candidate assert statements in a source code development tool.
Figure 14:
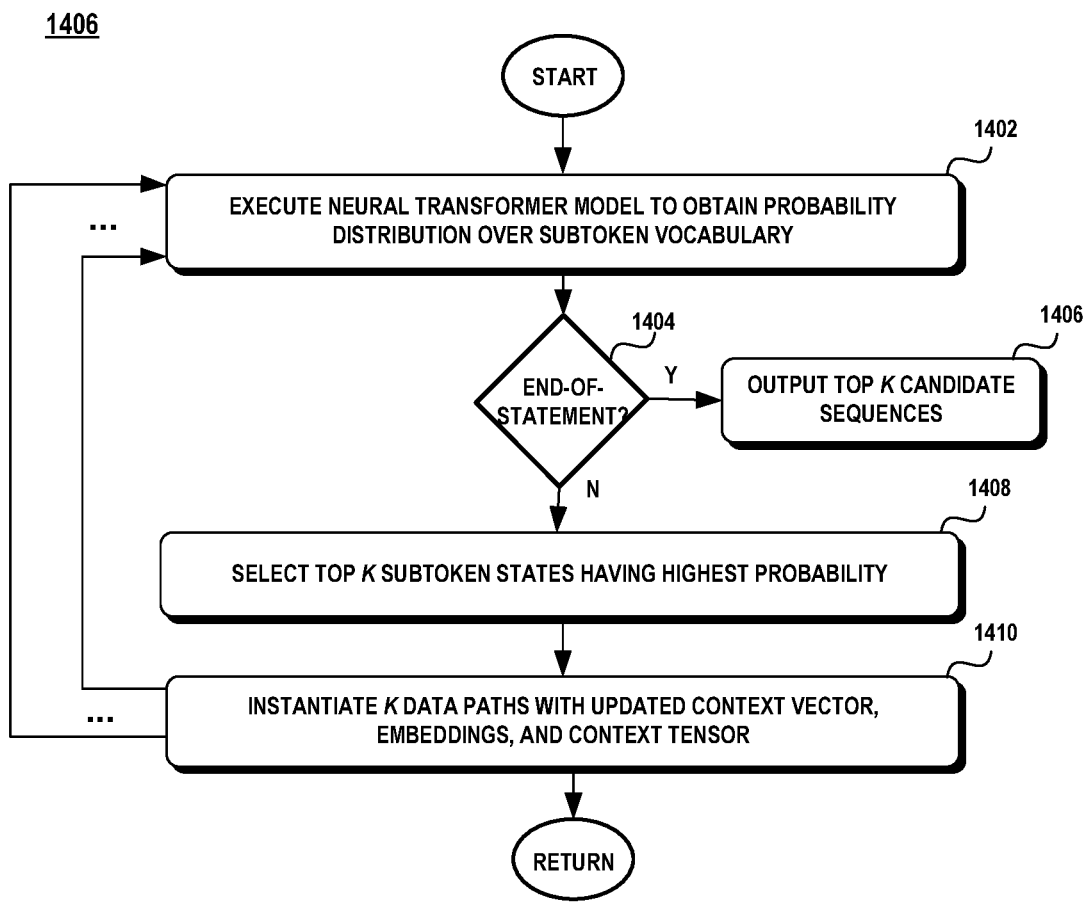
FIG. 14 is a flow diagram illustrating an exemplary method of the beam search used to generate candidate assert statements.

Turning to FIGS. 12, 13 and 14, in one aspect, the neural transformer model is used in a software development environment, such as a source code editor, browser, integrated development environment ("IDE"), or application (collectively, "source code development tool") as a standard feature or alternatively as an add-on, plug-in, extension and/or component. The source code development tool 1200 may include a user interface 1202 and an assert statement generator 1206. The assert statement generator 1206 includes the neural transformer model 1208.

The user interface 1202 includes a set of features or functions for developing (e.g., writing, editing, testing) a source code program. The user interface 1202 may include a window 1204 that displays the source code currently in the source code development tool 1200. The user interface 1202 may utilize a pop-up window 1214 to present possible candidate assert statements for completion thereby allowing a developer to browse through the candidates and to select one from the list.

At certain points in the editing process, the user interface 1202 will request candidate assert statements from the assert statement generator 1206 to complete a partially-written assert statement or a partially-written test method. The user interface 1202 may detect that the user has entered a particular character or a string of characters forming the beginning of an assert statement and automatically initiate a request for candidate assert statements to complete the partially-written assert statement. In one aspect, the user interface may detect that the developer typed in the "Assert" class. Alternatively, the user may utilize a special user prompt to indicate that a candidate assert statement is needed in a partially-written test method or partially-written assert statement. (Collectively, block 1302).

The assert statement generator 1206 forms a source code snippet that includes the partially-written test method with an inserted assert placeholder and the corresponding focal method. The focal method can be either specified by the user or automatically identified by the assert statement generator system. The automatic identification is performed by analyzing the latest method invocation in the partially-written test method, and retrieving it within the software project or repository. (Collectively, block 1304).

The assert statement generator 1206 transforms the source code snippet into a concrete syntax tree, generates a context vector representing a sequence of subtokens, obtains embeddings for the subtokens and creates a context tensor as noted above (block 1304). The assert statement generator 1206 performs a beam search until an end-of-method subtoken is reached (block 1306). The top k candidate assert statements are returned to the user interface 1202 (block 1308).

The user interface 1202 may display the candidate assert statements in a pop-up window 1204 in the user interface 1202 or alternatively display a single top candidate inserted into the current source code program. If the developer wants to accept a particular candidate assert statement, the developer may type in a particular keystroke or combination of keystrokes to accept the candidate assert statement which is then automatically inserted into the source code program. If the developer does not want to use the candidate assert statement, the candidate assert statement disappears when the developer continues typing. (Collectively, block 1308).

Turning to FIG. 14, the beam search uses the neural transformer model with the context tensor to generate a probability distribution for the subtoken vocabulary (block 1402). If the probability distribution indicates that the next likely token is the end-of-method token, then the beam search is finished (block 1404—yes) and the top k candidate assert sequences are returned to the user interface (block 1406). Otherwise (block 1404—no), the top k subtokens to complete a partial candidate assert sequence are selected (block 1408).

Each of the selected subtokens is then input in a respective context vector and has a separate data path through the neural transformer model again. The context vector utilizes the selected subtoken in the current context vector with the last subtoken removed. The new context vector will consist of T subtokens with the selected subtoken $t_k$ added to the beginning of the sequence with the last subtoken removed from the sequence. If the current context vector consists of a subtoken sequence consisting of $t_0, t_1, \ldots, t_T$, then the new context vector will consist of $t_k, t_0, t_1, \ldots, t_{T-1}$. (Collectively, block 1410).

Variations

It should be noted that the assert statement generator is not limited to having the transformed focal method and test method as the sole input to the neural transformer model with attention to predict assert statement candidates or to fine-tune the neural transformer model with attention. Additional data representing the context of the focal method's class may be included with the focal method during the training and inference of the neural transformer model with attention. In particular, the input to the model, may also include one or more of the following: (1) class constructor—the class name and constructor will inform the model on the expected installation of the class; (2) class attributes—the public class attributes will allow the model to generate assert statement candidates that can inspect and assert the value of the object's attributes; and (3) methods' signatures—the list of public methods' signatures in the focal class may be used by the model to setup the testing environment and inspect the result (e.g., using getters and setters).

Exemplary Operating Environment

Figure 15:
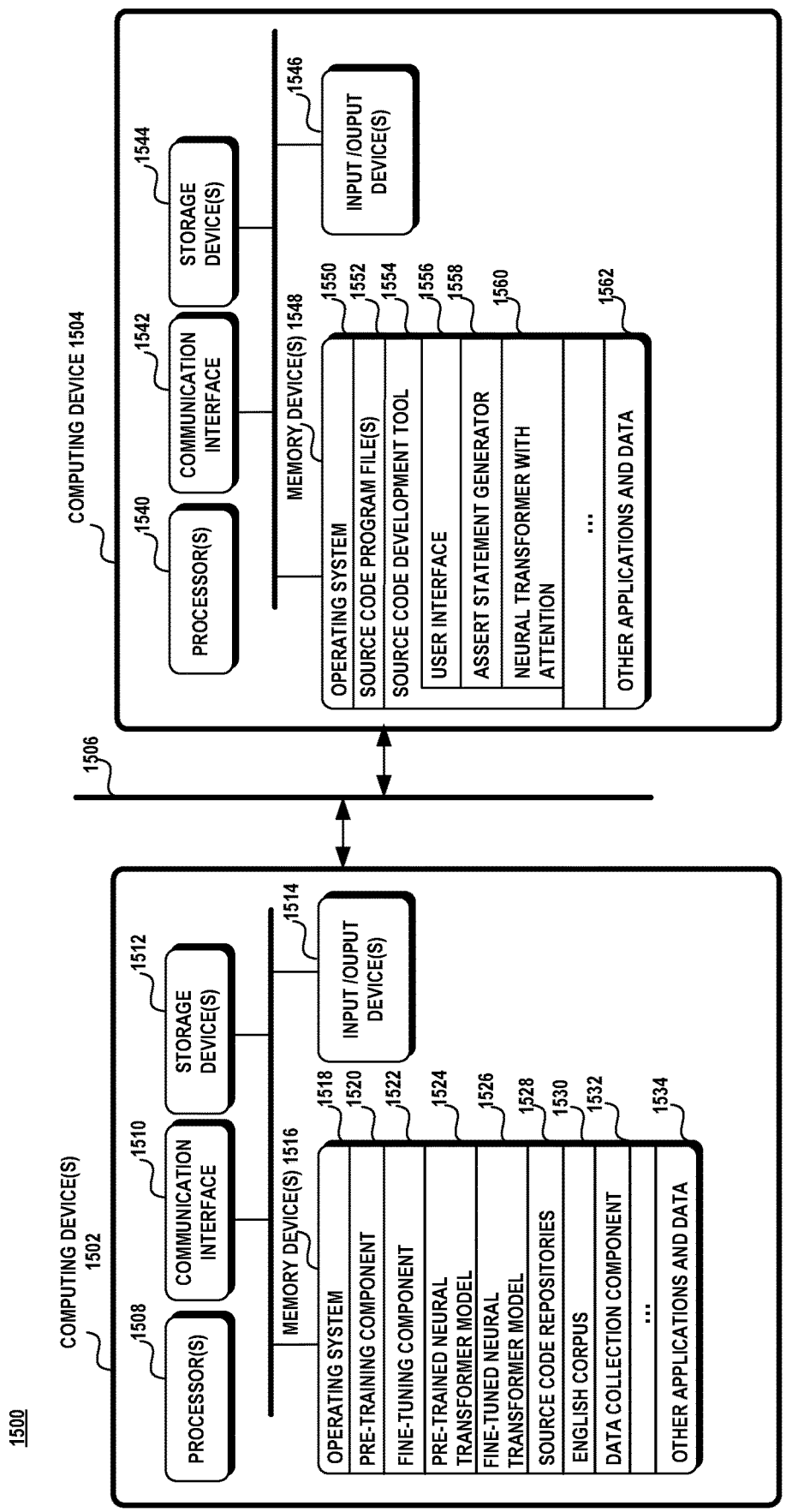
FIG. 15 is a block diagram illustrating an exemplary operating environment.

Attention now turns to a discussion of an exemplary operating environment. FIG. 15 illustrates an exemplary operating environment 1500 in which one or more computing devices 1502 are used to train the neural transformer model and a second computing device 1504 uses the neural transformer model with attention for assert statement generation. However, it should be noted that the aspects disclosed herein is not constrained to any particular configuration of devices. Any one of the computing devices 1502, 1504 may utilize the neural transformer model in its own assert statement generator and computing device 1504 may generate and test the neural transformer model with attention as well. Computing devices 1502 may be configured as a cloud service that generates the neural transformer model as a service for other systems. It should be noted that the operating environment is not limited to any particular configuration and other configurations are possible.

The computing devices 1502, 1504 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 1500 may be configured in a network environment, a distributed environment, a multi-processor environment, or a stand-alone computing device having access to remote or local storage devices.

The computing devices 1502, 1504 may include one or more processors 1508, 1540, one or more communication interfaces 1510, 1542, one or more storage devices 1512, 1544, one or more input/output devices 1514, 1546, and one or more memory devices 1516, 1548. A processor 1508, 1540 may be any commercially available or customized processor and may include dual microprocessors and multi-processor architectures. A communication interface 1510, 1542 facilitates wired or wireless communications between the computing device 1502, 1504 and other devices. A storage device 1512, 1544 may be computer-readable medium that does not contain propagating signals, such as modulated data signals transmitted through a carrier wave. Examples of a storage device 1512, 1544 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 1512, 1544 in the computing devices 1502, 1504. The input/output devices 1514, 1546 may include a keyboard, mouse, pen, voice input device, touch input device, display, speakers, printers, etc., and any combination thereof.

A memory device 1516, 1548 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 1516, 1548 may also include one or more external storage devices or remotely located storage devices that do not pertain to propagated signals, such as modulated data signals transmitted through a carrier wave.

Computing device 1504 may utilize a source code development tool 1554 that allows a user (e.g., developer, programmer, designer, coder, etc.) to design, code, compile, test, run, edit, debug or build a program, set of programs, web sites, web applications, and web services in a computer system. Software programs can include source code files, created in one or more source code languages (e.g., Visual Basic, Visual J#, C++, C#, J#, Java Script, APL, COBOL, Pascal, Eiffel, Haskell, ML, Oberon, Perl, Python, Scheme, Smalltalk and the like). The source code development tool 1554 may provide a native code development environment or may provide a managed code development that runs on a virtual machine or may provide a combination thereof. The source code development tool 1554 may provide a managed code development environment using the .NET framework. It should be noted that this operating embodiment is not constrained to providing the source code development services through any particular source code development tools and that other tools may be utilized instead, such as a stand-alone source code editor, IDE, browser and the like.

The memory device 1548 of computing device 1504 may contain instructions, components, and data. A component is a software program that performs a specific function and is otherwise known as a module, program, component, and/or application. The memory device 1548 may include an operating system 1550, one or more source code program files 1552, a source code development tool 1554 that may include a user interface 1556, an assert statement generator 1558, a neural transformer model with attention 1560 and other applications and data 1562.

The memory device 1516 of the computing devices 1502 may include an operating system 1518, a pre-training component 1520, a fine-tuning component 1522, a pre-trained neural transformer model 1524, a fine-tuned neural transformer model 1526, source code repositories 1528, English corpus 1530, a data collection component 1532, and other applications and data 1534.

The computing devices 1502, 1504 may be communicatively coupled via a network 1506. The network 1506 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 1506 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Conclusion

A system is disclosed comprising: one or more processors; and a memory that stores one or more programs that are configured to be executed by the one or more processors, the one or more programs including instructions that: pre-train a neural transformer model with attention with a first unsupervised training dataset, the first unsupervised training dataset including a plurality of sequences of natural language text; pre-train the neural transformer model with attention with a second unsupervised training dataset, the second unsupervised training dataset including a plurality of sequences of source code from source code methods of a programming language; fine-tune the neural transformer model with attention with a supervised training dataset, the supervised dataset including test-assert triplets; and deploy the neural transformer model with attention in a software development environment to generate an assert statement for a test method.

In one or more aspects, the one or more programs include further instructions that: generate a plurality of test-assert triplets, a test-assert triplet including a test method with an assert placeholder, a corresponding focal method, and an associated assert statement. In one or more aspects, the one or more programs include further instructions that: mine a source code repository for a plurality of test methods having a single assert statement. In one or more aspects, the one or more programs include further instructions that: apply a span mask to sequences of the second unsupervised training dataset; and wherein the pre-trained neural transformer model with attention is trained to learn syntax of a programming language of the source code methods by replacing the span mask of a sequence with appropriate source code.

In one or more aspects, the one or more programs include further instructions that: apply a span mask to sequences of the first unsupervised training dataset; and wherein the pre-trained neural transformer model with attention is trained to learn semantics of the natural language by replacing the span mask in a sequence with appropriate words of the natural language.

In one or more aspects, fine-tuning the neural transformer model with attention with a supervised training dataset is a translation task with a training objective that learns to translate a source code snippet, $s_i$, to an assert statement, $a_i$, as a conditional probability $P(a_i|tm_i'+fm_i)$, where $tm_i'$ is a test method annotated with an assert placeholder and $fm_i$ is a corresponding focal method.

In one or more aspects, the natural language text is English language and the source code is written in a same programming language.

A method is disclosed that is performed by one or more computing devices, comprising: pre-training a neural transformer model with attention with a first unsupervised training dataset, the first unsupervised training dataset including a plurality of sequences of natural language text; pre-training the neural transformer model with attention with a second unsupervised training dataset, the second unsupervised training dataset including a plurality of sequences of source code; fine-tuning the neural transformer model with attention with a supervised training dataset, the supervised dataset including test-assert triplets; and deploying the neural transformer model with attention in a software development environment to automatically generate an assert statement for a test method of a focal method.

In one or more aspects, the method further comprises mining a source code repository for a plurality of test methods having a single assert statement. In one or more aspects, the method further comprises identifying the focal method subject to a select test method by identifying a latest method call in the select test method. In one or more aspects, the method further comprises applying a span mask to sequences of the second unsupervised training dataset; and wherein the pre-trained neural transformer model with attention is trained to learn syntax of a programming language of the source code methods by replacing the span mask of a sequence with appropriate source code.

In one or more aspects, the method further comprises applying a span mask to sequences of the first unsupervised training dataset; and wherein the pre-trained neural transformer model with attention is trained to learn semantics of the natural language by replacing the span mask in a sequence with appropriate words of the natural language.

In one or more aspects, the neural transformer model with attention includes a plurality of encoder blocks and a plurality of decoder blocks, an encoder block having a multi-head attention layer, a decoder block having a masked multi-head attention layer. In one or more aspects, at least one of the plurality of encoder blocks includes a gaussian error linear unit activation function. In one or more aspects, the natural language text is English and the source code is written in a same programming language.

A device is disclosed having at least one processor and a memory. The at least one processor is configured to: detect a partially-written test method of a source code program under development in a software development environment, wherein the partially-written test method is a unit test for a focal method; identify the focal method that is subject of the partially-written test method; generate a source code snippet including the partially-written test method with an assert placeholder and the focal method; invoke a neural transformer model with attention with the source code snippet to predict an assert statement for the partially-written test method; and present the predicted assert statement in the software development environment.

In one or more aspects, the at least one processor is further configured to perform a beam search to find the predicted assert statement, wherein the beam search uses a probability distribution from the neural transformer model with attention at each timestep to identify a next subtoken in a candidate assert statement sequence. In one or more aspects, the neural transformer model with attention is pre-trained on an unsupervised dataset of English language text and an unsupervised dataset of source code and fine-tuned on test-assert triplets.

In one or more aspects, the at least one processor is further configured to identify the focal method automatically by identifying a latest method call in the partially-written test method. In one or more aspects, the software development environment is an integrated development environment or source code editor.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system, comprising:
a processor and a memory;
wherein the memory includes a program having executable instructions that when executed on the processor performs actions that:
  detect a partially-written test method of a source code program under development in a software development environment, wherein the partially-written test method is a partially-written unit test for a focal method without an assert statement;
  identify the focal method that is subject of the partially-written test method;
  generate a source code snippet including the partially-written test method with an assert placeholder and the focal method, wherein the assert placeholder indicates a position in the partially-written test method for the assert statement;
  cause a beam search to generate the assert statement for the partially-written test method, wherein the beam search generates partial sequences of tokens iteratively at each of a plurality of timesteps, wherein the beam search invokes a neural-based model, given the source code snippet, at each of the plurality of timesteps, to generate a probability distribution to identify top-k tokens to be appended to a partial sequence of tokens, wherein the beam search expands search for the asset statement by instantiating new partial sequences with the top-k tokens identified by the probability distribution generated by the neural-based model until a termination condition exists, upon occurrence of the termination condition, a select one of the partial sequences is output as the assert statement for the partially-written test method, wherein the neural-based model is trained to generate the assert statement having been pre-trained on natural language text and source code and fine-tuned with test-assert triplets; and
  present the generated assert statement in the software development environment.

2. The system of claim 1, wherein the program includes executable instructions that when executed on the processor performs actions that:
  identify the focal method automatically from a last method call in the partially-written test method.

3. The system of claim 1, wherein the program includes executable instructions that when executed on the processor perform actions that:
  identify the focal method automatically from user input.

4. The system of claim 1, wherein the termination condition occurs when the probability distribution indicates an end-of-method token as a most likely token to complete the select partial sequence.

5. The system of claim 1, wherein the neural-based model is trained to generate candidate assert statements for unit test methods that test a particular focal method.

6. The system of claim 1, wherein the program includes executable instructions that when executed on the processor performs actions that:
  insert the assert statement into the source code program.

7. The system of claim 1, wherein the program includes executable instructions that when executed on the processor performs actions that:
  detect the partially-written test method of the source code program from user input forming a beginning of the assert statement.

8. The system of claim 1, wherein the program includes executable instructions that when executed on the processor perform actions that:
  detect the partially-written test method of a source code program from a user prompt indicating a need for the generated assert statement.

9. The system of claim 1, wherein the neural-based model is a neural transformer model with attention.

10. The system of claim 1, wherein the neural-based model is provided a context of the focal method, wherein the context comprises a class constructor associated with the focal method, one or more class attributes, or one or more method signatures in a focal class associated with the focal method.

11. A computer-implemented method, comprising:
obtaining a partially-written test method of a source code program, wherein the partially-written test method is a partially-written unit test for a focal method, wherein the partially-written unit test is without an assert statement;
extracting the focal method that is subject of the partially-written test method;
creating a source code snippet including the partially-written test method with an assert placeholder and the focal method, wherein the assert placeholder indicates a position in the partially-written test method for the assert statement;
causing a beam search to generate the assert statement for the partially-written test method, wherein the beam search generates partial sequences of tokens iteratively at each of a plurality of timesteps, wherein the beam search invokes a neural-based model, given the source code snippet, at each of the plurality of timesteps, to generate a probability distribution to identify top-k tokens to be appended to a partial sequence, wherein the beam search expands search for the assert statement by instantiating new partial sequences with the top-k tokens identified by the probability distribution generated by the neural-based model until a termination condition exists, upon occurrence of the termination condition, a select one of the partial sequences is output as the assert statement for the partially-written test method, wherein the neural-based model is trained to generate the assert statement having been pre-trained on natural language text and source code and fine-tuned with test-assert triplets; and outputting the generated assert statement in the source code program.

12. The method of claim 11, further comprising:
identifying the focal method automatically from a last method call in the partially-written test method.

13. The method of claim 11, further comprising:
identifying the focal method automatically from user input.

14. The method of claim 11, wherein the termination condition occurs when the probability distribution indicates an end-of-method token as a most likely token to complete the select partial sequence.

15. The method of claim 11, further comprising:
displaying select ones of the plurality of candidate assert statements.

16. The method of claim 15, further comprising:
inserting the chosen one of the select ones of the plurality of candidate assert statements into the source code program.

17. The method of claim 11, further comprising:
detecting the partially-written test method of the source code program from user input forming a beginning of the assert statement.

18. The method of claim 11, further comprising:
detecting the partially-written test method of a source code program from a user prompt indicating a need for the generated assert statement.

19. The method of claim 11, wherein the neural-based model is a neural transformer model with attention.

20. The method of claim 11, wherein the neural-based model is provided a context of the focal method, wherein the context comprises a class constructor associated with the focal method, one or more class attributes, or one or more method signatures in a focal class associated with the focal method.

* * * * *